(12) United States Patent
Kim et al.

(10) Patent No.: US 10,890,705 B2
(45) Date of Patent: *Jan. 12, 2021

(54) DISPLAY APPARATUS AND METHOD OF MANUFACTURING THE SAME

(71) Applicant: Samsung Display Co., Ltd., Yongin-si (KR)

(72) Inventors: Hyungjin Kim, Seoul (KR); Hanmoe Cha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,508

(22) Filed: Dec. 28, 2017

(65) Prior Publication Data

US 2018/0143369 A1    May 24, 2018

Related U.S. Application Data

(63) Continuation of application No. 14/878,844, filed on Oct. 8, 2015, now Pat. No. 9,885,820.

(30) Foreign Application Priority Data

Dec. 10, 2014   (KR) .................. 10-2014-0177632

(51) Int. Cl.
*F21V 8/00*       (2006.01)
*G02F 1/13357*    (2006.01)
(Continued)

(52) U.S. Cl.
CPC ........... *G02B 6/0035* (2013.01); *G02B 6/004* (2013.01); *G02B 6/0065* (2013.01);
(Continued)

(58) Field of Classification Search
CPC ... F21K 9/64; F21V 13/04; F21V 7/00; F21Y 2103/10; G02B 6/0011; G02B 6/0021;
(Continued)

(56) References Cited

U.S. PATENT DOCUMENTS 5,269,977 A * 12/1993 Nakahashi ............ B29C 39/006
264/1.1
6,264,343 B1    7/2001 Miyashita et al.
(Continued)

FOREIGN PATENT DOCUMENTS

JP    2008130279 A  *  6/2008
KR   10-1998-0067886      10/1998
(Continued)

OTHER PUBLICATIONS

Notice of Allowance dated Sep. 28, 2017, issued in the U.S. Appl. No. 14/878,844.

(Continued)

*Primary Examiner* — Alexander K Garlen
*Assistant Examiner* — Colin J Cattanach
(74) *Attorney, Agent, or Firm* — H.C. Park & Associates, PLC

(57) ABSTRACT

A display apparatus according to an embodiment of the inventive concept may include a display panel, a light guide panel, and the light source. The light guide plate may include a light guide portion, a barrier rib portion, a wavelength conversion portion, and a cover portion. The barrier rib portion may be disposed on an upper surface of the light guide portion. The wavelength conversion portion may be disposed on the upper surface of the light guide portion to be surrounded by the barrier rib portion. The cover portion may be disposed on the wavelength conversion portion and the barrier rib portion, and cover the wavelength conversion portion.

10 Claims, 9 Drawing Sheets

(51) Int. Cl.
*G02F 1/1335* (2006.01)
*G02F 1/1333* (2006.01)
*G02F 1/017* (2006.01)

(52) U.S. Cl.
CPC ...... *G02F 1/1333* (2013.01); *G02F 1/133524* (2013.01); *G02F 1/133609* (2013.01); *G02F 1/133611* (2013.01); *G02F 1/133615* (2013.01); *G02F 1/133617* (2013.01); *G02F 2001/01791* (2013.01); *G02F 2001/133614* (2013.01)

(58) Field of Classification Search
CPC .... G02B 6/0025; G02B 6/005; G02B 6/0073; G02B 6/0026; G02B 6/0051; G02B 6/0053; G02B 6/004; G02B 6/0041; G02B 6/0043; G02B 6/0055; G02B 6/0065; G02F 2001/133614; G02F 2201/08; G02F 1/133615
See application file for complete search history.

(56) References Cited

U.S. PATENT DOCUMENTS

| | | | |
|---|---|---|---|
| 7,771,108 B2 | 8/2010 | Iwasaki | |
| 8,052,315 B2* | 11/2011 | Iwasaki | G02B 6/0068 362/608 |
| 8,118,465 B2 | 2/2012 | Kunimochi et al. | |
| 8,294,846 B2* | 10/2012 | Kajita | G02F 1/133603 349/64 |
| 8,684,588 B2 | 4/2014 | Ajichi et al. | |
| 9,207,393 B2 | 12/2015 | Yang et al. | |
| 9,242,310 B2 | 1/2016 | Kim et al. | |
| 9,458,992 B2* | 10/2016 | Lee | G02B 6/0096 |
| 9,575,239 B2 | 2/2017 | Nakayama | |
| 9,885,820 B2* | 2/2018 | Kim | G02B 6/0035 |
| 10,591,775 B2* | 3/2020 | Zhou | G02B 6/0043 |
| 2002/0126470 A1* | 9/2002 | Saito | G02B 6/0086 362/633 |
| 2006/0056200 A1* | 3/2006 | Yamashita | G02B 6/0013 362/620 |
| 2007/0222910 A1* | 9/2007 | Hu | G02B 6/0088 349/58 |
| 2007/0273274 A1* | 11/2007 | Horiuchi | F21K 9/64 313/504 |
| 2008/0068530 A1* | 3/2008 | Lee | G02B 6/0088 349/58 |
| 2008/0151554 A1* | 6/2008 | Burkard | G02B 6/0043 362/330 |
| 2008/0158907 A1 | 7/2008 | Lin et al. | |
| 2009/0168398 A1* | 7/2009 | Collier | G02B 6/0038 362/84 |
| 2010/0128198 A1* | 5/2010 | Kim | G02B 6/0088 349/61 |
| 2010/0187975 A1* | 7/2010 | Tsukahara | G02B 6/0038 313/503 |
| 2011/0037926 A1* | 2/2011 | Tsukahara | G02B 6/005 349/64 |
| 2011/0199556 A1* | 8/2011 | Oohira | G02F 1/133308 349/62 |
| 2012/0050636 A1* | 3/2012 | Jeong | G02F 1/133308 349/58 |
| 2012/0113672 A1* | 5/2012 | Dubrow | B82Y 20/00 362/602 |
| 2012/0170282 A1* | 7/2012 | Lin | G02B 6/0036 362/341 |
| 2013/0163282 A1 | 6/2013 | Kunimochi | |
| 2014/0022819 A1* | 1/2014 | Oh | G02B 6/005 362/607 |
| 2014/0029239 A1* | 1/2014 | Oh | G02B 5/0242 362/84 |
| 2014/0036203 A1* | 2/2014 | Guillou | G02B 6/0003 349/62 |
| 2014/0334181 A1* | 11/2014 | Hu | G02B 6/0023 362/608 |
| 2015/0117052 A1* | 4/2015 | Hsu | G02B 6/0043 362/606 |
| 2015/0124480 A1* | 5/2015 | Baker | G02B 5/0242 362/609 |
| 2015/0219832 A1* | 8/2015 | Baek | G02B 6/0031 362/607 |
| 2015/0301272 A1* | 10/2015 | Chang | G02B 6/00 349/58 |
| 2016/0025921 A1* | 1/2016 | Park | G02B 6/0053 362/84 |
| 2017/0299792 A1* | 10/2017 | Oh | F21V 9/32 |
| 2019/0004217 A1* | 1/2019 | Couillard | G02B 19/0009 |

FOREIGN PATENT DOCUMENTS

| | | |
|---|---|---|
| KR | 10-2007-0021658 | 2/2007 |
| KR | 10-2010-0046698 | 5/2010 |
| KR | 10-0972495 | 7/2010 |
| KR | 10-2012-0075049 | 7/2012 |
| KR | 10-2012-0088273 | 8/2012 |
| KR | 10-1177480 | 8/2012 |
| KR | 10-2012-0105953 | 9/2012 |
| KR | 10-2013-0015847 | 2/2013 |

OTHER PUBLICATIONS

Examination Report dated Nov. 24, 2020, issued to Korean Patent Application No. 10-2014-0177632.

* cited by examiner

DISPLAY APPARATUS AND METHOD OF MANUFACTURING THE SAME

CROSS-REFERENCE TO RELATED APPLICATIONS

This application is a Continuation of U.S. patent application Ser. No. 14/878,844, filed on Oct. 8, 2015, and claims priority from and the benefit of Korean Patent Application No. 10-2014-0177632, filed on Dec. 10, 2014, each of which is hereby incorporated by reference for all purpose as if fully set forth herein.

BACKGROUND OF THE INVENTION

Field of the Invention

The present disclosure herein relates to a display apparatus and a method of manufacturing the same, and more particularly, to a display apparatus with improved display quality and a method of easily manufacturing the display apparatus.

Description of the Related Art

In a non-luminous display apparatus, such as a liquid crystal display, a display panel displaying an image does not emit light by itself. The non-luminous display apparatus displays an image by using light supplied from a backlight unit. The backlight unit includes a light source and a light guide plate guiding the light emitted from the light source to a light-emitting surface.

The light guide plate guides and diffuses light incident into one side thereof to emit the light through a front surface of the display panel. The light incident into the light guide plate is moved inside the light guide plate, and is emitted through the front surface of the light guide plate. A light conversion member including quantum dots is recently used in order to improve the efficiency of the light supplied to the display panel. The light conversion member may convert blue light into white light.

The above information disclosed in this Background section is only for enhancement of understanding of the background of the invention and therefore it may contain information that does not form the prior art that is already known in this country to a person of ordinary skill in the art.

SUMMARY OF THE INVENTION

The present disclosure provides a display apparatus with improved manufacturing yield and display quality.

The present disclosure also provides a method of easily manufacturing a display apparatus.

An embodiment of the inventive concept provides a display apparatus which includes: a display panel receiving light to display an image; a light guide plate guiding the light to the display panel; and a light source disposed on one side of the light guide plate to supply the light to the light guide plate. The light guide plate includes: a light guide portion; a barrier rib portion disposed on an upper surface of the light guide portion, and disposed along an edge of the upper surface of the light guide portion; a wavelength conversion portion disposed on the upper surface of the light guide portion to be surrounded by the barrier rib portion, and including the wavelength conversion material; and a cover portion disposed on the wavelength conversion portion and the barrier rib portion, and covering the wavelength conversion portion.

The light guide portion, the barrier rib portion, and the cover portion may include a transparent material, and the light guide portion and the barrier rib portion may be integrally formed.

The light guide portion and the cover portion may include a transparent material, and the barrier rib portion may include a non-transparent material.

The wavelength conversion portion may further include a photocurable resin, and the wavelength conversion material may be a quantum dot.

At least one of the light guide portion and the cover portion may include glass.

The light guide plate further includes an adhesive member disposed between the cover portion and the barrier rib portion, and configured to adhere the cover portion to the barrier rib portion.

The barrier rib portion may include frit glass.

The light source may supply blue light, and the wavelength conversion material may convert blue light into green light and red light.

An outer surface of the barrier rib portion may be coplanar with a side surface of the light guide portion.

Another embodiment of the inventive concept provides a method of manufacturing a display apparatus, and the method includes steps of: forming a light guide plate, disposing the light guide plate on a lower surface of a display panel; and disposing a light source generating light on one side of the light guide plate. The formation of the light guide plate includes steps of: forming a barrier rib portion having a rectangular closed loop shape on a light guide portion; providing a wavelength conversion portion surrounded by the barrier rib portion on the light guide portion; and disposing a cover portion on the barrier rib portion and the wavelength conversion portion.

The wavelength conversion portion may include a wavelength conversion material and a photocurable resin, and when the photocurable resin is cured, the cover portion and the wavelength conversion portion may be attached to each other.

The formation of the barrier rib portion may include etching the light guide portion to form the barrier rib portion.

The barrier rib portion and the light guide portion may be integrally formed, and each of the barrier rib portion and the light guide portion may be formed of glass.

At least one of the light guide portion and the cover portion may be formed of glass.

The barrier rib portion may be formed of frit glass.

The formation of the light guide plate may further include: disposing the cover portion on the barrier rib portion and the wavelength conversion portion; and irradiating a laser on the barrier rib portion to attach the barrier rib portion and the cover portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
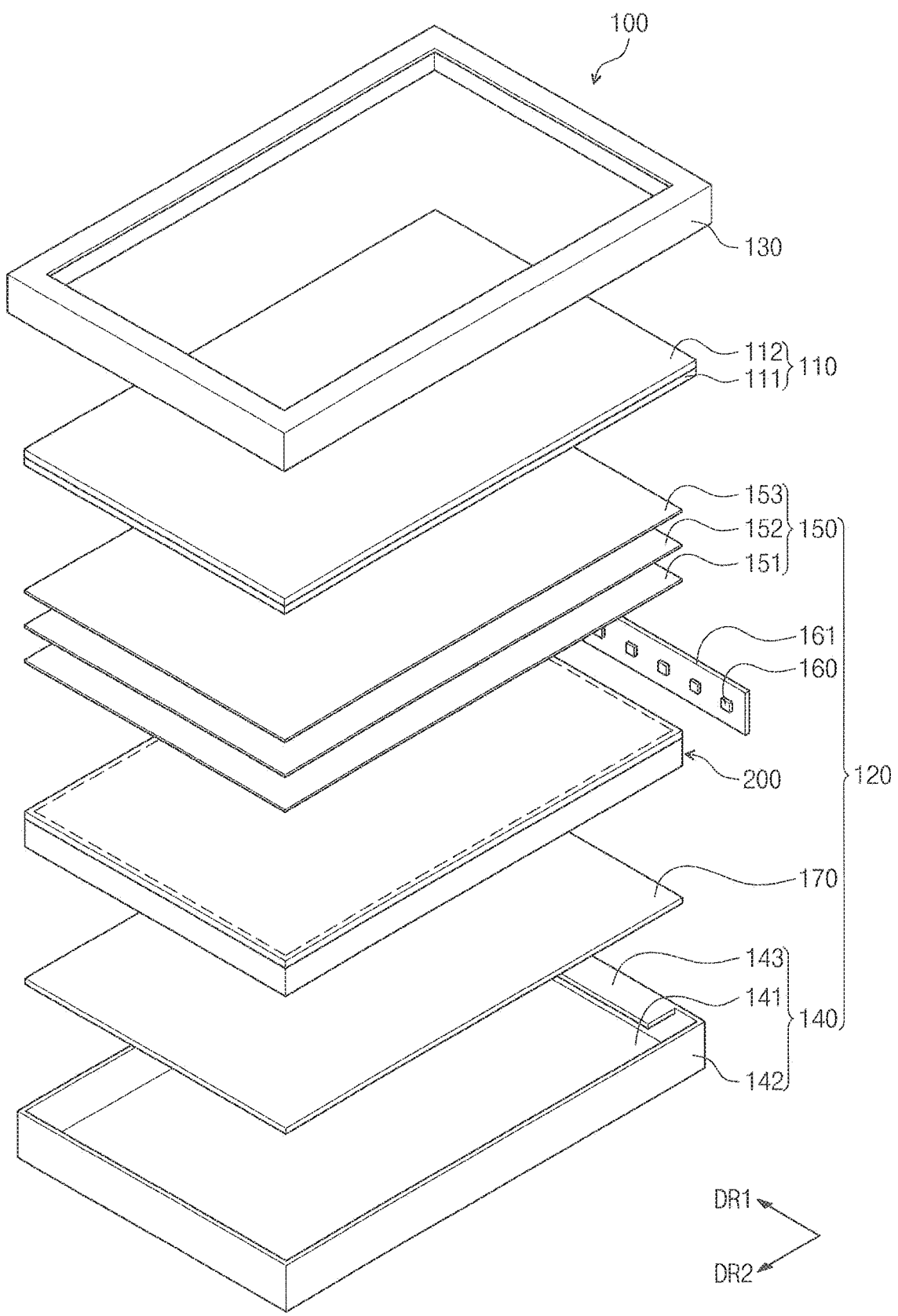
FIG. 1 is an exploded perspective view illustrating a display apparatus according to an embodiment of the inventive concept.

Hereinafter, specific embodiments of the inventive will be examined in detail with reference to the accompanying drawings. Objects, features, and effects of the inventive concept will be clarified through following embodiments related to the accompanying drawings. The inventive concept may, however, be embodied in different forms and should not be construed as limited to the embodiments set forth herein. Embodiments of the inventive concept, which will be described later, are provided so that this disclosure will be thorough and complete, and will fully convey the concept of the invention concept to those skilled in the art. Therefore, the inventive concept should not be construed as being limited to the embodiments as will be described later. Meanwhile, like reference numerals refer to like elements throughout.

Also, throughout the specification, terms such as "first", "second" and the like were not used to limit the meaning or the scope of the inventive concept, but merely used to differentiate one member from another one. In the description, it will be understood that when a film, a region, or an elements is referred to as being "above" or "on" another element, it can be directly on the other element or intervening elements may also be present.

Figure 2:
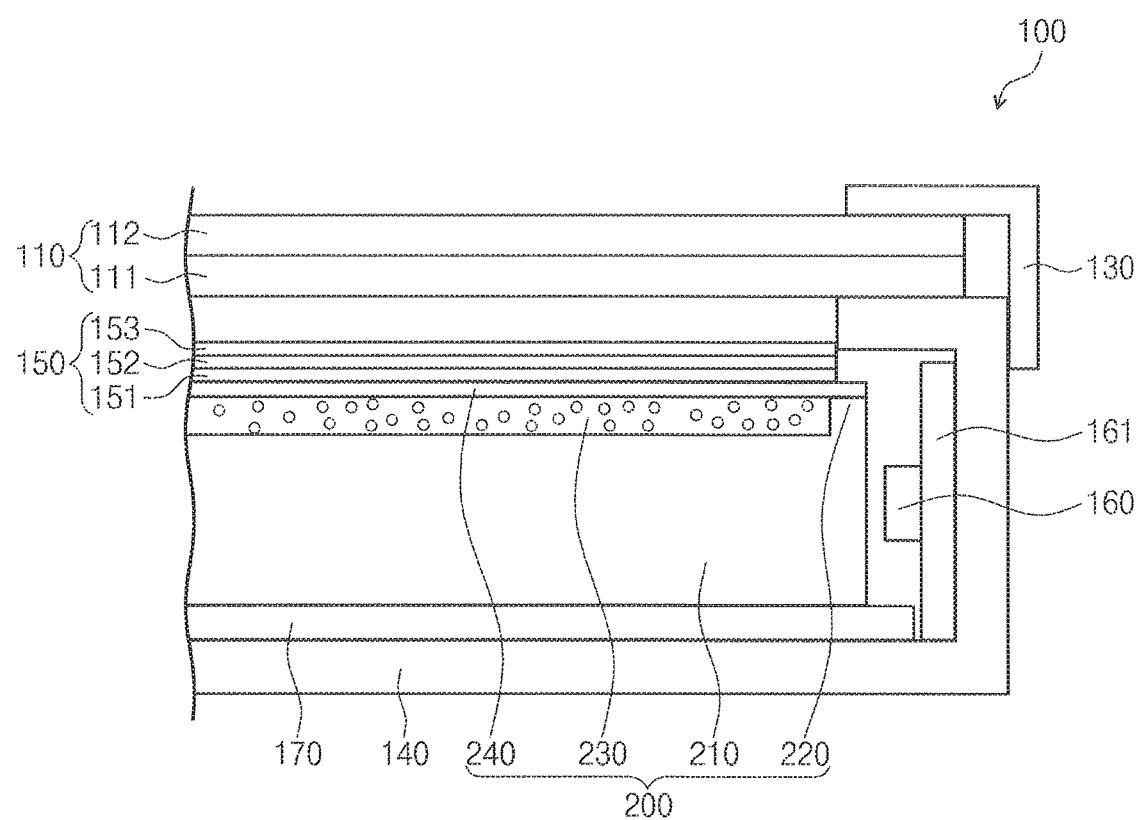
FIG. 2 is a cross-sectional view illustrating the display apparatus of FIG. 1.

FIG. 1 is an exploded perspective view illustrating a display apparatus according to an embodiment of the inventive concept, and FIG. 2 is a cross-sectional view illustrating the display apparatus of FIG. 1.

In reference to FIGS. 1 and 2, a display apparatus 100 may include a display panel 110, a backlight unit 120, and a top chassis 130.

The display panel 110 displays an image. The display panel 110 may be any one of a liquid crystal display panel, an electro wetting display panel, an electrophoretic display panel, and a micro electro mechanical system (MEMS) display panel. In the present embodiment, the liquid crystal display panel will be exemplarily described.

The display panel 110 may have a quadrangle plate shape that has two pairs of sides. In the present embodiment, the display panel 110 may have a rectangular plate shape that has a pair of long sides and a pair of short sides. The display panel 110 includes a display substrate 111, an opposite substrate 112 opposed to the display substrate 111, and a liquid crystal layer (not shown) interposed between the display substrate 111 and the opposite substrate 112. The display panel 110 may have a display region on which an image is displayed, and a non-display region on which an image is not displayed as viewed from above.

The backlight unit 120 supplies light to the display panel 110, and is disposed under the display panel 110. The backlight unit 120 may include a receiving unit 140, optical sheets 150, a light source 160, a printed circuit board 161, a reflective sheet 170, and a light guide plate 200.

The receiving unit 140 may include a bottom portion 141, side walls extending from the bottom portion 141, and a cover 143 extending from the side walls 142 in parallel to the bottom portion 141 to cover the light source 160. The side walls 142 may extend in an upper direction from the bottom portion 141. The receiving unit 140 may receive the light source 160 and the light guide plate 200. In addition, the light source 160 and the light guide plate 200 may be disposed on the bottom portion 141.

The optical sheets 150 may be disposed between the light guide plate 200 and the display panel 110. The optical sheets 150 may control a path of light guided from the light guide plate 200. The optical sheets 150 may include a diffusion sheet 151, a prism sheet 152, and a protection sheet 153.

The diffusion sheet 151 diffuses light, and the prism sheet 152 may collect light such that a propagation direction of light diffused in the diffusion sheet 151 is close to a normal direction of the display panel 110. The protection sheet 153 may protect the prism sheet from external impact. In the present embodiment, while it is exemplarily described that the optical sheets 150 may include the diffusion sheet 151, the prism sheet 152, and the protection sheet 153 singly, the inventive concept is not limited thereto. For example, in another embodiment of the inventive concept, the optical sheets 150 may be configured such that at least one of the diffusion sheet 151, the prism sheet 152, and the protection sheet 153 is provided in plurality, the plurality of sheets overlap each other, and any one sheet is omitted as needed. Also, unlike the present embodiment, in another embodiment, functions of the optical sheets 150 may be integrally provided to the light guide plate 200 by forming a pattern or the like on the light guide plate 200.

The light guide plate 200 may guide light supplied from the light source 160 to the display panel 110. In the present embodiment, the light guide plate 200 may include a light guide portion 210, a barrier rib portion 220, a wavelength conversion portion 230, and a cover portion 240.

The light guide portion 210 may have a rectangular shape that has two sides extending in a first direction DR1, and two sides extending in a second direction DR2 intersecting with the first direction DR1. The light guide portion 210 may receive light supplied from the light source 160 to guide the received light to the display panel 110.

A material forming the light guide portion 210 may include at least one selected from polyamide (PA), polymethyl methacrylate (PMMA), mkethyl methacrylate-styrene (MS), polycarbonate (PC), and glass. More specifically, the material forming the light guide portion 210 may be glass. When the material forming the light guide portion 210 is glass, the light guide portion 210 may be improved in penetration resistance for preventing penetration of external moisture, external air and the like. Also, the light guide portion 210 may protect the wavelength conversion portion 230 from heat.

The barrier rib portion 220 may be disposed on an upper surface of the light guide portion 210. The barrier rib portion 220 may be disposed along an edge of the upper surface of the light guide portion 210. In the present embodiment, the barrier rib portion 220 may have a rectangular closed loop shape. A space in which the wavelength conversion portion 230 is formed, may be defined on the upper surface of the light guide portion 210 by the barrier rib portion 220.

The wavelength conversion portion 230 may be disposed on the upper surface of the light guide portion 210, and be surrounded by the barrier rib portion 220. The wavelength conversion portion 230 may change a wavelength of light emitted from the light source 160. In the present embodiment, the thickness of the wavelength conversion portion 230 may be equal to that of the barrier rib portion 220. Since the space in which the wavelength conversion portion 230 is formed, is defined by the barrier rib portion 220, the wavelength conversion portion 230 may be uniformly formed on the upper surface of the light guide portion 210.

The cover portion 240 may be disposed on upper surfaces of the barrier rib portion 220 and the wavelength conversion portion 230. The cover portion 240 may include a material that has penetration resistance for preventing the penetration of moisture, air and the like. For example, the cover portion 240 may include at least one selected from polyamide (PA), polymethyl methacrylate (PMMA), mkethyl methacrylate-styrene (MS), polycarbonate (PC), and glass.

Unlike the present embodiment, in another embodiment, the cover portion 240 may have a multi-layered structure in which a plurality of films are stacked. For example, the cover portion 240 may include a plurality of film layers including polyethylene terephthalate (PET). Also, in order to improve penetration resistance for preventing the penetration of moisture, air and the like, the cover portion 240 may further include an oxide-based film between the plurality of film layers. The oxide-based film may be a transparent film. The oxide-based film may include, but not particularly limited to, a material typically used, for example, a titanium oxide ($TiO_x$).

According to the present embodiment, since the wavelength conversion portion 230 is fully sealed by the light guide portion 210, the barrier rib portion 220, and the cover portion 240, the wavelength conversion portion 230 may be protected from the penetration of external moisture, external air and the like. As a result, the lifespan of the wavelength conversion portion 230 may be improved. Also, according to the present embodiment, the wavelength conversion portion 230 may be integrally provided on the light guide plate 200. Accordingly, an additional structure for fixing the wavelength conversion portion 230 may be omitted.

While the present embodiment exemplarily describes the flat display apparatus 100, unlike the present embodiment, in another embodiment, the display apparatus 100 may have a shape that is curved along the second direction DR2. In this case, the thickness of the curved light guide plate may be thinner than that of the light guide plate 200 of the flat display apparatus. As a result, the curving of the light guide plate 200 may be easier.

Unlike the present embodiment, in another embodiment of the inventive concept, a pattern, such as a prism pattern or a projected pattern, which performs an optical function for collecting light, may be formed on an upper portion of the cover portion 240 adjacent to the display panel 110. In this case, the optical sheets 150 may be omitted. Also, a reflective pattern reflecting light or a collimating pattern may be formed on a lower surface of the light guide portion 210. In this case, light directed toward the lower surface of the light guide portion 210 may be easily reflected by the reflective pattern, the collimating pattern or the like to be guided to the display panel 110.

The light source 160 may be disposed on one side of the light guide plate 200 to supply light to the light guide plate 200. The light source 160 may be disposed on the printed circuit board 161 to receive driving voltage from the printed circuit board 161. The light source 160 may be provided in plurality and the plurality of light sources 160 may be arranged on the printed circuit board 161 along the first direction DR1.

The reflective sheet 170 may be disposed between the light guide plate 200 and the bottom portion 141. The reflective sheet 170 may reflect light leaking out of the light guide plate 200 to allow the leaked light to be again incident into the light guide plate 200.

The top chassis 130 may be disposed on the display panel 110 to cover the non-display region of the display panel 110. The top chassis 130 is coupled to the receiving unit 140 to cover an edge of the display panel 110. In addition, a display window exposing the display region of the display panel may be defined in the top chassis 130. Unlike the present embodiment, in another embodiment, the top chassis 130 may be omitted. In this case, the display panel 110 may be coupled to the receiving unit 140 by an adhesive member or the like.

Figure 3:
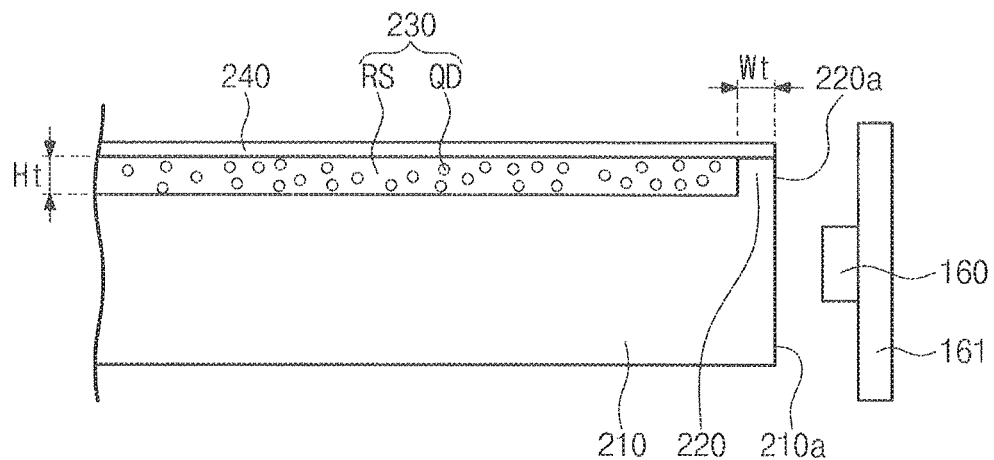
FIG. 3 is a schematic cross-sectional view illustrating the light guide plate and the light source of FIG. 2.

FIG. 3 is a schematic cross-sectional view illustrating the light guide plate and a light source of FIG. 2.

In reference to FIG. 3, the wavelength conversion portion 230 may include a wavelength conversion material QD and a resin RS. The wavelength conversion portion 230 may convert first light supplied from the light source 160 into second light. For example, the wavelength conversion portion 230 may convert light supplied from the light source 160 into white light. The first light may be blue light, and the second light may be white light.

In the present embodiment, the wavelength conversion material QD may be a quantum-dot. In another embodiment, the wavelength conversion material QD may be, but not limited to, a phosphor.

Quantum dots are semiconductor particles having a nanometer-scale diameter, and have the photoluminescence characteristic. The quantum dot has an intrinsic band gap, and emits light having a wavelength range corresponding to the band gap when excited electrons return to a stable state. The quantum dot has a characteristic in which the band gap is in inverse proportion to a size thereof. Therefore, the quantum dot may generate light that has a desired wavelength region through the adjustment of the size thereof. The quantum dots are distributed in the wavelength conversion portion 230. As described above, the wavelength of light emitted from the wavelength conversion portion 230 may be varied by adjusting the mixing ratio of quantum dots having different sizes.

The wavelength conversion material QD may include quantum dots having different sizes depending on a kind of the light source 160. For example, when the light source 160 generate blue light, the wavelength conversion material QD may include quantum dots having a size that absorbs light having a blue wavelength range to emit light having a green wavelength range, and quantum dots having a size that absorbs light having a blue wavelength range to emit light having a red wavelength range.

The wavelength conversion material QD of the wavelength conversion portion 230 absorbs blue light supplied from the light source 160 to convert the blue light into light having a green or red wavelength range. Also, a portion of the blue light may not be absorbed into the wavelength conversion material QD. Accordingly, light having a blue wavelength range, light having a green wavelength range, and light having a red wavelength range may be mixed with one another to generate white light in the wavelength conversion portion 230.

According to the present embodiment, since the wavelength conversion portion 230 is formed on the flat light guide portion 210, the wavelength conversion material QD may be uniformly distributed. Accordingly, uniform white light may be supplied to the display panel (110 of FIG. 2) from the light guide plate 200.

The wavelength conversion portion 230 may have a thickness Ht of about 0.05 mm to about 0.15 mm, but the inventive concept is not limited thereto. The thickness Ht of the wavelength conversion portion 230 may be adjusted according to a concentration of the wavelength conversion material QD. For example, as the concentration of the wavelength conversion material QD increases, the thickness Ht of the wavelength conversion portion 230 may decrease. The height of the barrier rib portion 220 may be determined in correspondence to the thickness Ht of the wavelength conversion portion 230.

The barrier rib portion 220 may have a width Wt of about 0.5 mm or more, and preferably, about 1 mm. In the present embodiment, an outer surface 220a of the barrier rib portion 220 may be coplanar with a side surface 210a of the light guide portion 210.

In the present embodiment, since a side surface of the wavelength conversion portion 230 is covered by the barrier rib portion 220, it is unnecessary that the cover portion 240 covers a side surface of the light guide plate 200. Accordingly, the display apparatus (100 of FIG. 1) may have an advantage in realizing a narrow bezel. Also, the cover portion 240 has a plate shape, and covers flat surfaces on the barrier rib portion 220 and the wavelength conversion portion 230.

Different from the present exemplary embodiment, when the cover portion 240 is bending to the side surface of the light guide plate 200, the light leakage phenomenon easily generated on an edge of the light guide plate 200. However, according to the present exemplary embodiment, the cover portion 240 has a plate shape, the light guide plate 200 may be prevented a light leakage phenomenon on an edge of the light guide plate 200.

In the present embodiment, the light guide portion 210 and the barrier rib portion 220 may be integrally and simultaneously formed together as a single integral and monolithic and continuous structure. The light guide portion 210 and the barrier rib portion 220 may include a transparent material. Also, the light guide portion 210 and the barrier rib portion 220 may include a material that has penetration resistance for preventing the penetration of moisture and air. The light guide portion 210 and the barrier rib portion 220 may include, for example, glass. Therefore, the light guide portion 210 and the barrier rib portion 220 may protect the wavelength conversion portion 230 from air and moisture.

Figure 4:
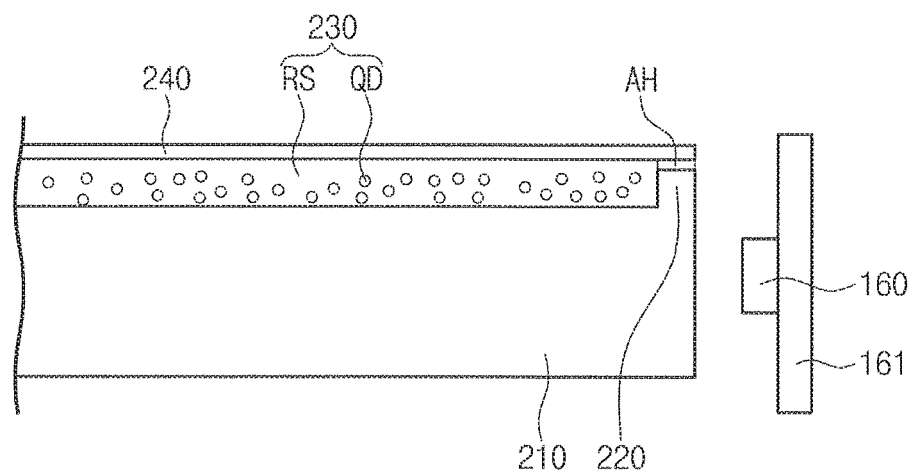
FIG. 4 is a schematic view illustrating a light guide plate and a light source according to another embodiment of the inventive concept.

FIG. 4 is a schematic view illustrating a light guide plate and a light source according to another embodiment of the inventive concept. In describing FIG. 4, the same reference numbers are used to refer to the same elements as those described with reference to FIG. 3, and the description of the elements will be omitted.

In reference to FIG. 4, an adhesive member AH may be further disposed on the barrier rib portion 220. The cover portion 240 and the barrier rib portion 220 may be more easily attached to each other by the adhesive member AH. In this case, since the cover portion 240 and the barrier rib portion 220 may be more strongly attached to each other by the adhesive member AH, the penetration of external air, moisture or the like into the wavelength conversion portion 230 may be prevented. As a result, characteristics such as the lifespan of the wavelength conversion portion 230 may be improved.

Figure 5:
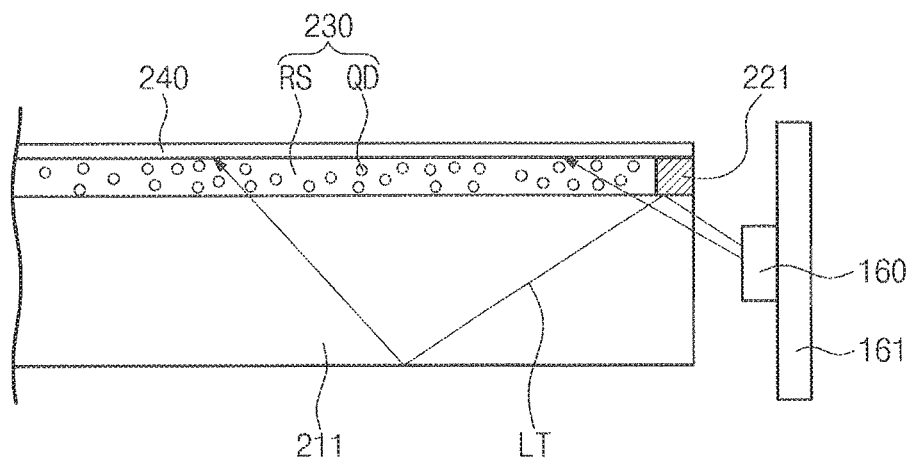
FIG. 5 is a schematic view illustrating a light guide plate and a light source according to another embodiment of the inventive concept.

FIG. 5 is a schematic view illustrating a light guide plate and a light source according to another embodiment of the inventive concept.

In reference to FIG. 5, in the present embodiment, the barrier rib portion 221 may include a non-transparent material. More specifically, the barrier rib portion 221 may include a reflective material.

The reflective material may include, but not particularly limited to, a material typically used, for example, at least one selected from silver (Ag), copper (Cu), aluminum (Al), nickel (Ni), and titanium (Ti). Also, the barrier rib portion 221 may include a non-transmissive resin as a non-transmissive material.

In the present embodiment, light LT emitted from the light source 160 to barrier rib portion 221 may be reflected by the barrier rib portion 221 to be again incident into the light guide portion 211. After being again incident into the light guide portion 211, the light LT is again reflected to be emitted through the wavelength conversion portion 230.

According to the present embodiment, since the light LT emitted to the barrier rib portion 221 is not emitted through the barrier rib portion 221, but is reflected therefrom, all light emitted from the light source 160 may be emitted through the wavelength conversion portion 230. Therefore, a bluish phenomenon, which may be generated by light that is not emitted through the wavelength conversion portion 230, may be prevented. As a result, uniform white light may be supplied to the display panel (110 of FIG. 1).

Figure 6:
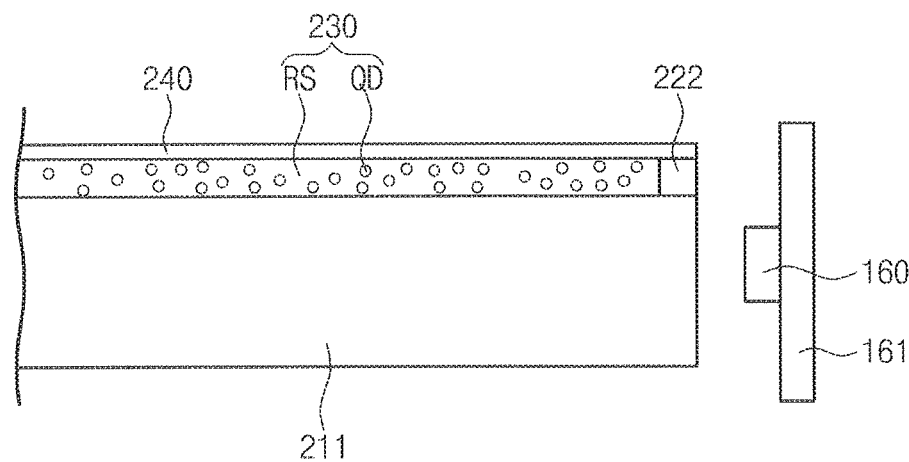
FIG. 6 is a schematic view illustrating a light guide plate and a light source according to another embodiment of the inventive concept.

FIG. 6 is a schematic view illustrating a light guide plate and a light source according to another embodiment of the inventive concept. In describing FIG. 6, the same reference numbers are used to refer to the same elements as those described with reference to FIG. 3, and a description of the elements will be omitted.

In reference to FIG. 6, in the present embodiment, the barrier rib portion 222 may include frit glass. The frit glass may be formed by drying and firing frit paste. The frit paste may include frit powder particles and filler particles. Each of the filler particles may include a crystalline material, and each of the powder particles may include oxide or the like for improving adhesion force.

Since the cover portion 240 and the light guide portion 211 may be strongly bonded to each other by the barrier rib portion 222 including the fit glass, the penetration of external air, external moisture or the like into the wavelength conversion portion 230 may be easily prevented. Also, according to the present embodiment, the adhesive member for attaching the barrier rib portion 222 and the cover portion 240 may be omitted.

FIGS. 7A to 7G are views illustrating a method of manufacturing the light guide plate illustrated in FIG. 2.

Figure 7A:
FIGS. 7A to 7G are views illustrating a method of manufacturing the light guide plate illustrated in FIG. 2.
Figure 7B:
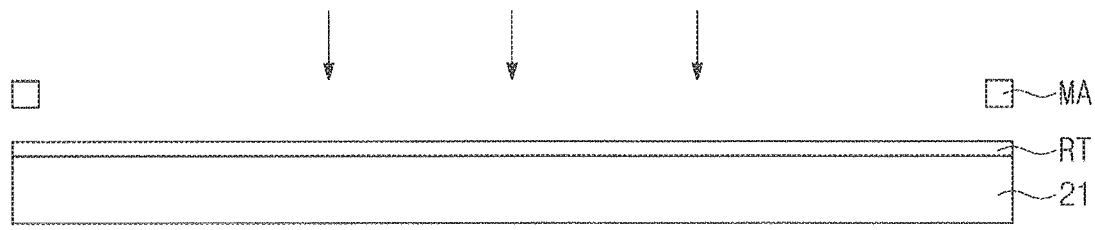

In reference to FIG. 7A, a mother substrate 21 is prepared. The mother substrate 21 may be formed of a transparent material, for example, glass.

Figure 7C:

In reference to FIGS. 7A and 7C, a photosensitive film RT may be formed on the mother substrate 21. After that, a mask MA may be disposed over the photosensitive film RT. In the present embodiment, the photosensitive film RT may be formed of a positive sensitive material. An exposure process is performed with respect to the photosensitive film RT by using the mask MA. While the exposure process is performed, light may not be irradiated on the photosensitive film RT corresponding to a location on which a barrier rib portion (220 of FIG. 7D) is being formed.

After the exposure process is performed, a development process may be performed with respect to the exposed photosensitive film RT. While the development process is performed, a portion of the photosensitive film RT on which light is irradiated, may be removed to form a mask pattern RP.

Figure 7D:
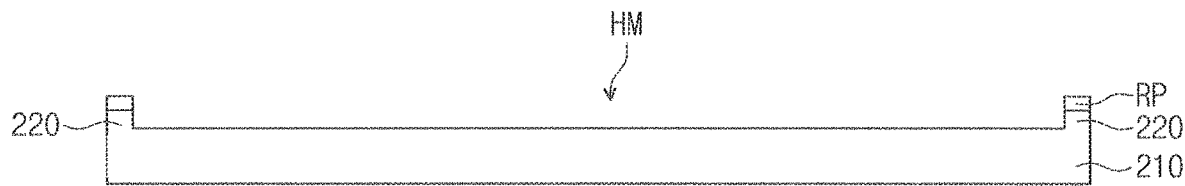

In reference to FIG. 7D, the mother substrate (21 of FIG. 7C) is etched by using the mask pattern RP. As a result, the mother substrate (21 of FIG. 7C) may be partitioned into a light guide portion 210 and a barrier rib portion 220 protruding from the light guide portion 210.

A receiving groove HM surrounded by the barrier rib portion 220 may be formed on an upper surface of the light guide portion 210. The receiving groove HM is formed during the etching, and may be defined as a groove dented from an upper surface of the mother substrate (21 of FIG. 7C).

Figure 7E:
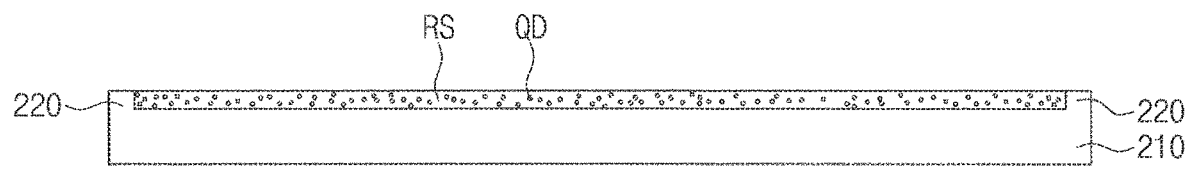

In reference to FIG. 7E, a resin RS including a wavelength conversion material QD may be applied on the receiving groove (HM of FIG. 7C). According to the present invention, since a liquid resin RS mixed with a wavelength conversion material QD, is applied on the flat receiving groove (HM of FIG. 7C), the wavelength conversion material QD may be uniformly applied on the light guide portion 210. As a result, uniform white light may be supplied to the display panel (110 of FIG. 1).

Figure 7F:
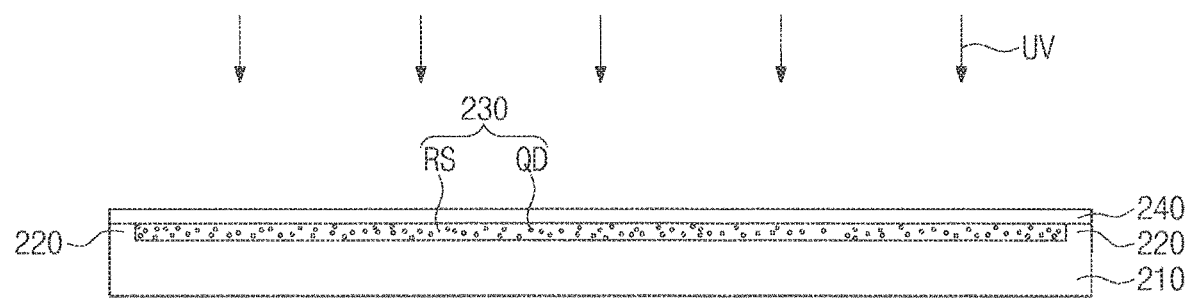
Figure 7G:
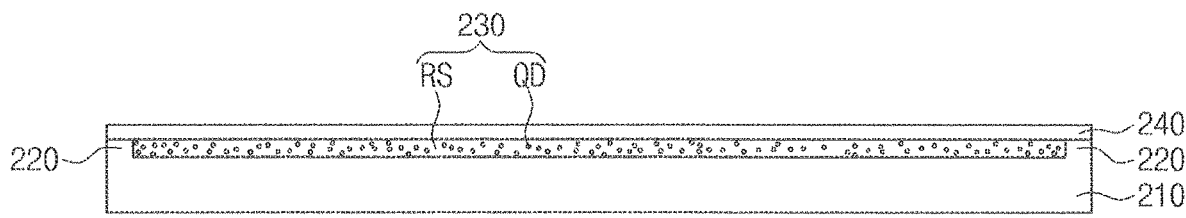

In reference to FIGS. 7F and 7G, the cover portion 240 may be disposed on the resin RS including the wavelength conversion material QD and the barrier rib portion 220. In the present embodiment, the resin RS may be a photocurable resin.

After the cover portion 240 is disposed, an ultraviolet (UV) ray may be irradiated on the resin RS. The resin RS may be cured by the ultraviolet (UV) ray. While the resin RS is cured, the resin RS and the cover portion 240 may be attached to each other. Also, the resin RS may be cured to form a wavelength conversion portion 230.

According to the present embodiment, since the cover portion 240 and the wavelength conversion portion 230 closely contact each other by the cured resin RS, a separate process of applying an adhesive member or the like may be omitted, so that processes may be simplified.

Also, according to the present embodiment, since a side wall of the wavelength conversion portion 230 is shielded by the barrier rib portion 220, the wavelength conversion portion 230 may be prevented from being exposed to external air, moisture and the like. Therefore, the lifespan of the wavelength conversion portion 230 may be improved.

FIGS. 8A to 8D are views illustrating a method of manufacturing the light guide plate illustrated in FIG. 6.

Figure 8A:
FIGS. 8A to 8D are views illustrating a method of manufacturing the light guide plate illustrated in FIG. 6.

In reference to FIG. 8A, a light guide portion 211 is prepared. The light guide portion 211 may be formed of a transparent material, for example, glass.

Figure 8B:
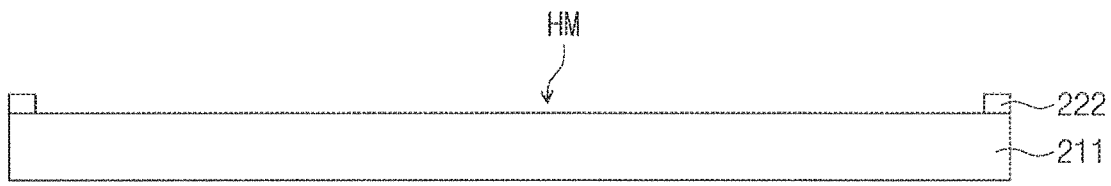

In reference to FIG. 8B, a barrier rib portion 222 is formed on the light guide portion 211. The barrier rib portion 222 may include frit glass formed by drying and firing frit paste. The barrier rib portion 222 may be formed by using a syringe, or a silk screen method.

Figure 8C:
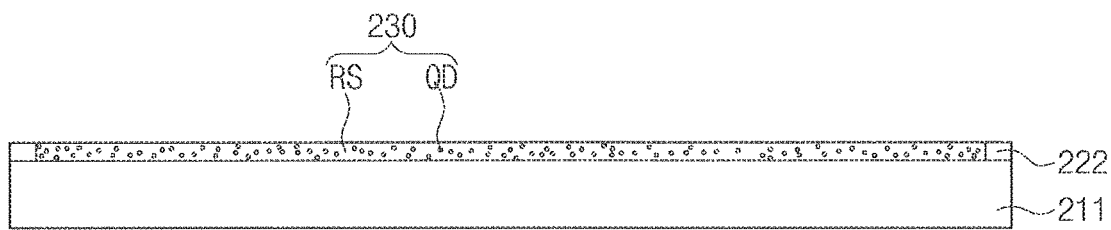

In reference to FIG. 8C, a wavelength conversion portion 230 is formed on a receiving groove (HM of FIG. 8B) defined between the barrier rib portions 222. According to the present invention, since a liquid resin RS mixed with a wavelength conversion material QD, is applied on the flat receiving groove (HM of FIG. 8B), the wavelength conversion material QD may be uniformly applied on the light guide portion 211. As a result, uniform white light may be supplied to the display panel (110 of FIG. 1).

In the present embodiment, the resin RS may be cured by using ultraviolet (UV) rays to form a wavelength conversion portion 230. Unlike the present embodiment, in another embodiment of the inventive concept, as described in FIGS. 7A to 7G, a cover portion 240 is disposed, and then the resin RS may be cured to form the wavelength conversion portion 230.

Figure 8D:
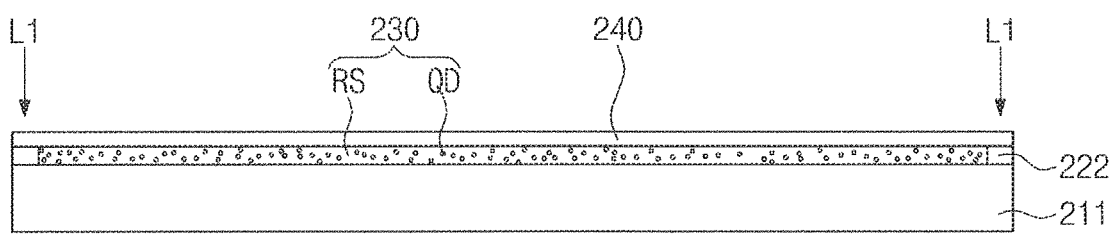

In reference to FIG. 8D, the cover portion 240 is disposed on the barrier rib portion 222 and the wavelength conversion portion 230. In the present embodiment, the cover portion 240 may be formed of a transparent material, for example, glass.

After the cover portion 240 is disposed, a laser L1 may be irradiated from an upper surface of the cover portion 240 to the barrier rib portion 222. While the barrier rib portion 222 contacting the cover portion 240 is instantaneously melted and then solidified, the cover portion 240 and the barrier rib portion 222 may be attached to each other.

According to the present embodiment, since the cover portion 240 and the barrier rib portion 222 which are cured may closely contact each other, a separate process of applying an adhesive member or the like may be omitted, so that processes may be simplified. Also, according to the present embodiment, since the wavelength conversion portion 230 is surrounded by the light guide portion 211, the barrier rib portion 222, and the cover portion 240, the wavelength conversion portion 230 may be prevented from being exposed to external air, moisture or the like. Therefore, the lifespan of the wavelength conversion portion 230 may be improved.

According to an embodiment of the inventive concept, since a wavelength conversion portion is fully sealed by a light guide portion, a barrier rib portion, and a cover portion, the wavelength conversion portion may be protected from the penetration of moisture, external air or the like. As a result, the lifespan of the wavelength conversion portion may be improved. Also, the wavelength conversion portion may be integrally provided on the light guide plate. Accordingly, an additional structure for fixing the wavelength conversion portion may be omitted.

Also, according to an embodiment of the inventive concept, since the wavelength conversion portion is formed on the flat light guide portion, a wavelength conversion material may be uniformly distributed. As a result, the light guide plate may supply uniform white light to a display panel.

Also, according to an embodiment of the inventive concept, since a side surface of the wavelength conversion portion is covered by the barrier rib portion, it is unnecessary that the cover portion covers a side surface of the light guide plate. Accordingly, the display apparatus may have an advantage in realizing a narrow bezel. Also, the cover portion has a plate shape, and covers flat surfaces on the barrier rib portion and the wavelength conversion portion. Therefore, a light leakage phenomenon easily generated on an edge of the light guide plate may be readily prevented.

Also, according to the inventive concept, when the barrier rib portion includes a non-transparent material, light emitted to the barrier rib portion is reflected by the barrier rib portion, so that the reflected light may be not emitted. Therefore, since a bluish phenomenon, which may be generated by light that is not emitted through the wavelength conversion portion 230, may be prevented, a backlight unit may supply uniform white light.

Further, while the present invention has been particularly shown and described with reference to exemplary embodiments thereof, it will be understood by those of ordinary skill in the art that various changes in form and details may be made therein without departing from the substantial features of the embodiments. For example, each element specifically appearing in the embodiment may be carried out through a modification. All differences related in the modification and application thereof will be construed as being included within the scope of the invention as defined by the following claims.

What is claimed is:

1. A display apparatus comprising: a display panel; a light guide plate; a wavelength conversion portion disposed on an upper surface of the light guide plate; wherein the light guide plate comprises: a light guide portion guiding a light to the display panel and disposed under the display panel, a side cover portion disposed on the upper surface of the light guide portion, extending along an edge of the upper surface of the light guide portion, and covering all lateral side surfaces of the wavelength conversion portion; and an upper cover portion disposed on the wavelength conversion portion and covering the wavelength conversion portion, wherein: a side surface of the side cover portion and a side surface of the light guide portion are connected to each other; the upper cover portion is extended to directly contact an entire upper surface of the side cover portion so as to directly couple the upper cover portion to the side cover portion; the wavelength conversion portion is fully sealed to prevent penetration of external moisture and air by the upper surface of the light guide portion, the side cover portion, and the upper cover portion; and a maximum thickness of the upper cover portion is less than a maximum thickness of the light guide portion; and wherein the light guide portion and the side cover portion are integrally formed of a transparent material.

2. The display apparatus of claim 1, wherein the upper cover portion comprises a multi-layered structure in which a plurality of films are stacked.

3. The display apparatus of claim 2, wherein the plurality of films comprise an inorganic layer and an organic layer.

4. The display apparatus of claim 3, wherein the inorganic layer is disposed on the wavelength conversion portion and the organic layer is disposed on the inorganic layer.

5. The display apparatus of claim 1, further comprising an adhesive member disposed between the upper cover portion and the entire upper surface of the side cover portion, wherein the upper cover portion is coupled to the side cover portion via the adhesive member.

6. The display apparatus of claim 1, wherein the wavelength conversion portion comprises a resin mixed with a wavelength conversion material.

7. The display apparatus of claim 1, wherein the upper cover portion includes an optical pattern provided on an upper surface of the upper cover portion adjacent to the display panel.

8. The display apparatus of claim 7, wherein the optical pattern is a prism pattern or a projected pattern.

9. The display apparatus of claim 1, wherein the light guide portion is glass.

10. The display apparatus of claim 1, wherein the wavelength conversion portion comprises a wavelength conversion material and a cured resin, the upper cover portion and the wavelength conversion portion closely contacting each other by the cured resin.

* * * * *